(12) United States Patent  
Jiménez Peris et al.

(10) Patent No.: US 10,095,745 B2  
(45) Date of Patent: Oct. 9, 2018

(54) PARALLEL PROCESSING OF CONTINUOUS QUERIES ON DATA STREAMS

(75) Inventors: Ricardo Jiménez Peris, Madrid (ES); Marta Patiño Martínez, Madrid (ES)

(73) Assignee: UNIVERSIDAD POLITECNICA DE MADRID, Madrid (ES)

( * ) Notice: Subject to any disclaimer, the term of this patent is extended or adjusted under 35 U.S.C. 154(b) by 792 days.

(21) Appl. No.: 13/805,107

(22) PCT Filed: Jun. 17, 2011

(86) PCT No.: PCT/EP2011/003011  
§ 371 (c)(1),  
(2), (4) Date: Apr. 4, 2013

(87) PCT Pub. No.: WO2011/157442  
PCT Pub. Date: Dec. 22, 2011

(65) Prior Publication Data  
US 2013/0204896 A1    Aug. 8, 2013  
US 2013/0346446 A9    Dec. 26, 2013

Related U.S. Application Data

(63) Continuation of application No. 13/112,628, filed on May 20, 2011, now abandoned.

(Continued)

(51) Int. Cl.  
*G06F 17/30* (2006.01)  
*G06F 9/50* (2006.01)

(52) U.S. Cl.  
CPC ...... *G06F 17/30516* (2013.01); *G06F 9/5066* (2013.01); *G06F 9/5088* (2013.01); *G06F 17/30445* (2013.01)

(58) Field of Classification Search  
CPC ......... G06F 17/30463; G06F 17/30864; G06F 17/3071; G06F 12/0253; G06F 9/505;  
(Continued)

(56) References Cited

U.S. PATENT DOCUMENTS 6,339,772 B1 * 1/2002 Klein ................ G06F 17/30492  
707/704  
7,676,461 B2 * 3/2010 Chkodrov ......... G06F 17/30463  
707/999.004

(Continued)

OTHER PUBLICATIONS

Cherniack et al. "Scalable Distributed Stream Processing" (2003).*  
(Continued)

*Primary Examiner* — Shew-Fen Lin  
(74) *Attorney, Agent, or Firm* — Jenkins, Wilson, Taylor & Hunt, P.A.

(57) ABSTRACT

A continuous query parallel engine on data streams provides scalability and increases the throughput by the addition of new nodes. The parallel processing can be applied to data stream processing and complex events processing. The continuous query parallel engine receives the query to be deployed and splits the original query into subqueries, obtaining at least one subquery; each subquery is executed in at least in one node. Tuples produced by each operator of each subquery are labeled with timestamps. A load balancer is interposed at the output of each node that executes each one of the instances of the source subquery and an input merger is interposed in each node that executes each one of the instances of a destination subquery. After checks are performed, further load balancers or input managers may be added.

12 Claims, 2 Drawing Sheets

Related U.S. Application Data

(60) Provisional application No. 61/356,353, filed on Jun. 18, 2010.

(58) Field of Classification Search
CPC ......... G06F 17/30445; G06F 17/30516; G06F 9/5066; G06F 9/5088; G06Q 30/02
USPC .......................... 707/713, 737, 718, 720, 759
See application file for complete search history.

(56) References Cited

U.S. PATENT DOCUMENTS

| | | | |
|---|---|---|---|
| 8,479,216 B2 * | 7/2013 | Lakshmanan | G06F 9/5088 709/201 |
| 2006/0218123 A1 * | 9/2006 | Chowdhuri | G06F 17/30445 |
| 2010/0241827 A1 * | 9/2010 | Yu | H04L 12/44 712/30 |
| 2011/0131198 A1 * | 6/2011 | Johnson | G06F 17/30498 707/714 |
| 2011/0302196 A1 * | 12/2011 | Bouillet | G06F 17/30516 707/769 |
| 2011/0314019 A1 | 12/2011 | Jimenez Peris | |
| 2012/0078951 A1 * | 3/2012 | Hsu | G06F 17/30445 707/769 |
| 2013/0191413 A1 * | 7/2013 | Chen | G06F 17/30424 707/769 |

OTHER PUBLICATIONS

Ivanova et al. "Customizable Parallel Execution of Scientific Stream Queries" (2005).*

Shah et al. " Flux: An Adaptive Partitioning Operator for Continuous Query Systems", Proceedings of the 19th International Conference on Data Engineering (ICDE'03).*

Ying Xing et al., "Dynamic Load Distribution in the Borealis Stream Processor." pp. 1-12.

Sirish Chandrasekaran et al., "TelegraphCQ. Continuous Dataflow Processing for an Uncertain World," pp. 1-12. Proceedings of the 2003 CIDR Conference.

Shah M A et al, "Flux: an adaptive partitioning operator for continuous query systems." Proceedings 19th International Conference on Data Engineering, (ICDE 2003), Bangalore, India, vol. Conf. 19, Mar. 5, 2003-Mar. 9, 2003, pp. 25-36, XP010678726, New York, New York.

Rene Mueller et al., "Streams on Wires—A Query Compiler for FPGAs," pp. 1-12.

Nesime Tatbul et al., "Staying FIT: Efficent Load Shedding Techniques for Distributed Stream Processing," pp. 1-12.

Mitch Cherniak et al., "Scalable Distributed Stream Processing," pp. 1-12, Proceedings of the 2003 CIDR Conference.

Milena Ivanoca et al, "Customizable Parallel Execution of Scientific Stream Queries," Technical Report 2005-012, Apr. 1, 2005, pp. 1-23, XP055009048, Uppsala University, acm Digital Library.

Jeong-Hyon Hwang et al, "High-Availability Algorithms for Distributed Stream Processing," 21st International Conference on Data Engineering, 2005. ICDE 2005. Proceedings. Tokyo, Japan. Apr. 5, 2005-Apr. 8, 2005, pp. 779-790, XP010788228, Piscataway, NJ, USA.

International Search Report for Application No. PCT/EP2011/003011 dated Oct. 10, 2011.

Frederick Reiss et al., "Data Triage: An Adaptive Architecture for Load Shredding in TelegraphCQ," pp. 1-12.

Daniel J. Abadi et al., "The Design of the Borealis Stream Processing Engine," pp. 1-13. Proceedings of the 2005 CIDR Conference.

Daniel J. Abadi et al., "Aurora: a new model and architecture for data stream management," The VLDB Journal, 2003/ Digital Object Identifier (DOI) 10.1007/s00778-003-0095-z, pp. 1-20. Springer-Verlag.

IPRP and Written Opinion for Application No. PCT/EP2011/003011 dated Dec. 19, 2012.

* cited by examiner

PARALLEL PROCESSING OF CONTINUOUS QUERIES ON DATA STREAMS

CROSS-REFERENCE TO RELATED APPLICATIONS

This application is filed under the provisions of 35 U.S.C. § 371 as a U.S. national phase application of International Patent Application No. PCT/EP2011/003011 filed on Jun. 17, 2011, which International Patent Application is a continuation of U.S. patent application Ser. No. 13/112,628 filed on May 20, 2011, and further claims benefit of U.S. Provisional Patent Application No. 61/356,353 filed on Jun. 18, 2010.

FIELD OF THE INVENTION

The present invention belongs to the data stream processing and event management fields.

STATE OF THE ART

Continuous query processing engines enable processing data streams by queries that process continuously those streams producing results that are updated with the arrival of new data in the data stream. Known continuous query processing engines are Borealis (Daniel J. Abadi, Yanif Ahmad, Magdalena Balazinska, Ugur Çetintemel, Mitch Cherniack, Jeong-Hyon Hwang, Wolfgang Lindner, Anurag Maskey, Alex Rasin, Esther Ryvkina, Nesime Tatbul, Ying Xing, Stanley B. Zdonik: The Design of the Borealis Stream Processing Engine. CIDR 2005: 277-289), Aurora (Daniel J. Abadi, Donald Carney, Ugur çetintemel, Mitch Cherniack, Christian Convey, Sangdon Lee, Michael Stonebraker, Nesime Tatbul, Stanley B. Zdonik: Aurora: a new model and architecture for data stream management. VLDB J. 12(2): 120-139 (2003)) y TelegraphCQ (Sirish Chandrasekaran, Owen Cooper, Amol Deshpande, Michael J. Franklin, Joseph M. Hellerstein, Wei Hong, Sailesh Krishnamurthy, Samuel Madden, Vijayshankar Raman, Frederick Reiss, Mehul A. Shah: TelegraphCQ: Continuous Dataflow Processing for an Uncertain World. CIDR 2003). Unlike data bases that perform instant queries on persistent data, stream processing engines perform continuous queries on data streams that evolve over time and are processed in memory without being stored in disk and their results also evolve over time.

None of the currently existing approaches enables to scale out with respect to the incoming stream volume. This is because the data stream processed by a query or operator query must go through a single node, containing the query or operator, and therefore the system capacity will be limited by the capacity of a single node. For stream volumes exceeding the processing capacity of a node these systems cannot scale out. In centralized engines such as Aurora or TelegraphCQ all the stream goes through the system centralized node and when that node is saturated it cannot scale out. In distributed engines as Borealis a query operator is deployed in a single node.

This implies that the whole stream processed by that operator is processed by the node where it runs and therefore when the node is saturated, the system cannot scale out. In some systems it is being tried to introduce a certain parallelism in queries such as Aurora* (Mitch Cherniack, Hari Balakrishnan, Magdalena Balazinska, Donald Carney, Ugur Çetintemel, Ying Xing, Stanley B. Zdonik: Scalable Distributed Stream Processing. CIDR 2003). In Aurora* a node is used to distribute the load between a set of nodes and another node to recombine it. Those two nodes again become a bottle-neck because once they are saturated, the system cannot scale out.

Load balancing has also being studied in the context of stream processing engines. In Ying Xing, Stanley B. Zdonik, Jeong-Hyon Hwang: Dynamic Load Distribution in the Borealis Stream Processor. ICDE 2005: 791-802, correlation between workloads is studied to avoid workload peaks in different operators that take place in the same node. However, this load balancing is studied in the context of distributed query engine that does not parallelize queries, therefore, it does not address the problem of how distribute the load between instances of the same subquery, but across different subqueries.

Another technique currently used to treat overloads is the removal of data items or tuples, known as load shedding (Frederick Reiss, Joseph M. Hellerstein: Data Triage: An Adaptive Architecture for Load Shedding in TelegraphCQ. ICDE 2005: 155-156), (Frederick Reiss, Joseph M. Hellerstein: Data Triage: An Adaptive Architecture for Load Shedding in TelegraphCQ. ICDE 2005: 155-156) and (Nesime Tatbul, Ugur Çetintemel, Stanley B. Zdonik: Staying FIT: Efficient Load Shedding Techniques for Distributed Stream Processing. VLDB 2007: 159-170). With this technique when a node is saturated it begins to discard tuples according to different criteria. The problem with this technique is the loss of information that is not permissible for a multitude of applications and also has associated tradeoffs such as precision loss in the result of queries or even consistency loss in the outcome of queries.

Another recently proposed technique is using hardware acceleration by the implementation of the data stream operators in hardware with FPGAs (René Müller, Jens Teubner, Gustavo Alonso: Streams on Wires—A Query Compiler for FPGAs. PVLDB 2(1): 229-240 (2009). This hardware approach enables improving the performance of single nodes but not scaling. That is, it makes a node have a larger capacity but once that capacity is exhausted this approach prevents further scaling.

The proposed invention is seen as a necessity with respect existing methods and processing engines on the market. The invention parallelizes continuous queries processing in a scalable way, with low distribution cost and it introduces elasticity and load balancing on the query parallel processing.

DESCRIPTION OF THE INVENTION

The invention presents a continuous query parallel engine on data streams. This parallel processing engine will solve the limitations of the state of the art avoiding that the data streaming query engine will process the whole stream with single nodes that limits the system capacity to the processing capacity of a single node.

Parallel processing of data streams allows providing scalability and that way, increasing the throughput by means of the addition of new nodes. This parallel processing can be applied to data stream processing and complex events processing.

A data stream is a sequence of data items or tuples that over time can grow without limitation and it is characterized by the sharing of the same data schema by all data items in the same stream. In many data streaming processing engines, data streams are labeled with a timestamp. Depending on the application, the stream can guarantee that the data is labeled with monotonically increasing timestamps.

A data stream processing engine or data stream management systems is a system that enables to deploy continuous queries over data streams. The processing engine labels the tuples with timestamps. These timestamps enable to establish a relative ordering among tuples.

A query is represented with an acyclic graphic of query operators. The query has one or more data input streams and one or more output streams. Each query operator can have one or more inputs and one or more outputs. Operators can be classified as stateless and stateful.

Stateless operators are characterized by each input tuple producing an output independently of any previous input tuple. Typical stateless query operators are map, filter and union. A map operator applies a function to every input tuple in order to obtain the corresponding output tuple. For example, given a tuple with a temperature in Fahrenheit degrees, it yields a tuple with the temperature in Celsius degrees. The filter operator given a sequence of n predicates, and n or n+1 outputs, it executes the following processing with each tuple. It applies the first predicate, if the predicate is satisfied it emits that tuple through the first output. If not, it applies the second predicate and if it is satisfied it emits that tuple through the second output. And so on, with the rest of predicates. If the number of predicates equals to the outputs number and no predicate is satisfied, the input tuple is discarded. If the outputs number is n+1 and no predicate is satisfied, the tuple is emitted through the output n+1. The union, given two or more input streams with the same schema, produces a single output stream with that schema and in which all tuples received by the different input streams are emitted.

Stateful operators keep a sliding window of input tuples and the result of processing an input tuple does not depend only on the input tuple but on the content of the tuples window. Sliding windows can be defined over time or over the number of tuples. The time period or the number of tuples admitted by the window is known as the length of the window. Some typical stateful operators are the aggregation operator and the join operator. The aggregation operator computes a function over the tuples contained in the input window, for instance, the number of tuples received in the last hour, or the average temperature over temperature stated by the tuples received during the last 24 hours. The join operator receives two input streams and keeps a window for each stream. The operator has as a predicate as parameter. For each pair of tuples, one from each input window, applies the predicate and if it is satisfied by the pair of tuples, it generates an output tuple which is the concatenation of the two input tuples. If the input sliding windows of the join operator input are defined over the time, they evolve as follows, when a tuple arrives in an input stream, all tuples with timestamp greater than the temporal length of the window are removed from the other window.

Stream processing engines can be centralized or distributed. A centralized stream processing engine has a single system instance executed in a single computer or node. That is, the system is executed in a single node. A distributed stream processing engine has multiple instances, that is, multiple executions of the system are performed and each instance can be executed by different nodes. The most basic distributed engines can execute different queries in different nodes. Thereby, they can scale out the number of queries by increasing the number of nodes. Some distributed engines enable distributing query operators in different nodes. This allows them to scale out with respect to the number of operators by increasing the number of nodes.

However, the present invention goes beyond the state of art by introducing a parallel distributed continuous query processing engine. That means that, on the one hand, multiple instances of the processing engine are executed in multiple nodes. On the other hand, multiple instances of the engine cooperate to process a subquery distributing the input stream and thereby scaling out with respect to the input stream volume.

One of the main difficulties to solve and one of the main contributions of the present invention is how to process in parallel one or more massive data streams by a set of nodes without concentrating any of the streams at any single node.

A continuous query abstractly is an acyclic graph of query operators. This query can be divided into a set of subqueries by splitting the query graph into a set of subgraphs.

Once divided into a set of subqueries, the query is deployed. This division can be performed according to any criterion. Some possible criterions are:
1) Not splitting the original query, that is, the division result would be a subquery identical to whole original source query.
2) Splitting the source query into as many subqueries as query operators it comprises, every subquery consisting of each of the query operators that appear in the source query.
3) Splitting the source query into subqueries, so every subquery contains a stateful operator, followed by one or more stateless operators, except possibly for an initial subquery containing only stateless operators.
4) Any other subdivision into subqueries.

The process of parallel processing that implements the parallel stream processing engine deploys each subquery into a set of nodes, such that every subquery is executed in at least one node. Each set of nodes can have an arbitrary number of nodes and may have different number of nodes across sets of nodes, and dynamically change their number independently.

If a query is divided into two or more subqueries, each pair of consecutive queries, source subquery and destination subquery, in which outputs of the source subquery are connected to one or more inputs of the destination subquery, they will be connected in their parallel distributed deployment as follows. Each of the subqueries since it is deployed on a set of nodes the connection will be made from each instance of the source subquery to each instance of the destination subquery.

The process of parallel processing considers two methods of query processing depending on how the source subquery is divided. If all subqueries satisfy the condition that contain at most an stateful operator and its input or inputs come from previous subqueries, then the parallel processing redistributes the streams between subqueries at origin and otherwise, at destination.

Parallel processing with source redistribution consists of interposing a load balancer at the output of each instance of the source subquery, named subquery local to the load balancer. That is, at each node of the source subquery a load balancer is interposed, so at every instance the source subquery output is connected to the input of the load balancer and its output is connected to all the instances of the destination subquery. At each instance of the destination subquery an input merger is interposed so all the outputs of the source subquery become input merger's inputs and its output becomes the input of the instance of the destination subquery. The instance of the query that is connected to the input merger is called local instance.

The parallel processing with destination redistribution, in addition to interpose a load balancer pair and an input merger between subqueries, they are also interposed in each subquery before each stateful operator preceded by any other operator in the subquery. That means that a tuple with destination redistribution may have to go through multiple instances till completing its processing by the destination subquery.

Given a subquery deployed in a set of nodes that satisfies the source redistribution condition, the processing between their different instances is performed as follows. The first operator of the destination subquery is a stateful operator. The stateful operator executes its operation depending on one or more key fields. Tuples with the same key must be aggregated (aggregation is just an example because it could be any operation executed by a stateful operator) together. That means they must be received by the same instance so they can be aggregated. Semantic aware redistribution distributes the tuples so tuples with the same key are received by the same instance of the query stateful operator. If the strategy used by the load balancers results in a semantic aware redistribution, it is said that the load balancer is semantic-aware.

In the parallelization strategy described, the load balancers that send tuples to a destination subquery beginning with a stateful query operator are semantic-aware. Any semantic-aware load balancing method can be used. For the sake of simplicity, in the description when it becomes necessary to refer to a load balancing method, it will be assumed the load balancing method detailed below. Given a stream with a key c, a possible method of redistribution is in which each tuple with key c, a hash function it is applied to obtain the value h=hash (c). From this value h the modulo operation is applied with a constant np, obtaining the value p=h mod np. This value p will be named partition identifier. Given a tuple, applying the previous process, its partition identifier is obtained. The total number of partitions is np, and each partition with identifier p is assigned to a subquery instance. The responsibility of processing the tuples from a partition thus corresponds to a single instance. This way, the method of redistribution satisfies the requirement of semantic awareness because all tuples that must be aggregated together will be sent to the same instance.

Regardless the type of redistribution, the parallelization can be done with or without guaranties of transparent parallelization. In the second case the parallelization is done to allow semantic awareness of stateful operators, but it does not guarantee that the resulting parallel execution is equivalent to an execution in a sequential engine. In the first case, it guarantees that parallel processing is equivalent to that would be observed in a sequential engine. This parallelization aspect is reflected in the load balancer and input merger.

When there is no guarantee of transparent parallelization, the input merger forwards tuples as soon as they are received from any of the source subqueries to the destination subquery is connected to or local instance of the subquery. This can produce an interleaving that would never occur in a sequential engine. The reason why these interleavings can occur is because the windows in each instance of a parallel stateful operator, for example, a join operator, slide independently. That is, tuple interleaving (relative order) in the two input streams in the sequential case would produce a sequence of overlapping windows with the corresponding output, in the parallel case, tuple interleaving in the two input streams can be different in each instance, producing different sequences of overlapping windows and thus, it might produce different outputs.

The load balancer and the input merger work as follows to guarantee transparent parallelization. Each input merger waits till it has received a tuple from each input stream before forwarding a tuple to the subquery is connected to or local subquery. It forwards the tuple with the smallest timestamp. Thus, parallel processing in each instance becomes independent of stream interleaving from the different load balancers. This process can be blocking.

If any source subquery does not produce tuples to be processed by the destination subquery, then the input merger will block. To avoid this situation the load balancers would work as it follows. Each load balancer keeps track of the last timestamp of the last tuple generated for each destination subquery. When no tuple is sent to a destination subquery for a maximum period of time m, then it sends a dummy tuple with an identical timestamp to the last one sent by that load balancer. When the dummy tuple is received by an input merger, it is just used to unblock the input merger processing. If it does not have the smallest timestamp, the input merger will take the tuple with smallest timestamp. Sooner or later, the dummy tuple will be the one with smallest timestamp, in that case, the input merger will just discard it. Thus, periodic generation of dummy tuples in the load balancers avoids blocking the input merger.

Elasticity is a property of distributed systems that refers to the capacity of growing and shrinking the number of nodes to process the incoming load by using the minimum required resources, that is, the minimum possible number of nodes able to process the incoming load satisfying the quality of service requirements.

Load balancing in a distributed system refers to the method used to distribute the load to be processed by the different nodes so the nodes have a similar load. When nodes have different processing capacity, the goal is to balance the relative load, that is, each node uses the same fraction of its processing capacity. Load balancing can be static or dynamic. Static load balancing is decided before deploying the system and it does not change during the execution. Dynamic load balancing is continually changing during execution time allowing the adaptation to changes in workload. A very important property of dynamic load balancing is that it must affect as the little as possible to processing capacity of nodes.

Elasticity and load balancing are closely related to each other because both properties need a common technique known as state transfer. State transfer consists of transferring part or all data from one node to another one. Once the state transfer to a node completes, that node is responsible for processing the load for that state. In the context of the present invention, the state of a stateful query operator consists of the sliding window of tuples and any needed value to generate the output, for example, the current aggregated value in a aggregation operator (for example, the average temperatures during the last hour).

The state transfer procedure consists of the following steps. Whenever the processing engine is reconfigured for whatever reason (for example: load imbalance, failure of a node, a new node is added to avoid overloading), the reconfiguration process reallocates data partitions from one or more instances to one or more instances. This problem can be split into individual data partition transfers from a source instance to a destination instance. That means that the state of that data partition has to be transferred from the source instance to the destination instance. For this, the greatest active timestamp in the system is examined, mt, and a new future timestamp is created, mtf=mt+f, where f∈N which provides a sufficient margin to alert all involved instances in the reconfiguration about the timestamp that begins the reconfiguration. This timestamp is sent to all involved instances, that is, to all instances of the source subquery, as well to the two instances of destination subquery that perform the state transfer. All tuples with timestamp less than or equal to mtf are processed by the source instance, while all tuples with timestamp greater than mtf are processed by the destination instances.

The load balancers of the source subquery store the mtf timestamp included in the reconfiguration command. Tuples belonging to the partition being reconfigured, p, with a timestamp less than or equal tomtf are sent to the instance of the destination subquery responsible for partition p before the reconfiguration, while tuples with greater timestamp than mtf are sent to instance of the destination subquery responsible for partition p after the reconfiguration. When first tuple of partition p greater than mtf is going to be sent, first, a tuple reporting the end-of-reconfiguration is sent to the two instances of the destination subquery involved in the state transfer.

The state transfer completes with the following steps. The source instance of the state transfer processes the received tuples. When the end-of-reconfiguration tuple is received from all load balancers of the source subquery, it knows no more tuples should be processed, so it transfers the state of partition p to the destination instance of the state transfer. The destination instance of the state transfer when receives the state transfer of partition p applies that state and stores the responsibility for partition p. When it receives the end-of-reconfiguration tuples from all load balancers of the source subquery, it starts the processing of partition p. At this point the state transfer is over and the responsibility for partition p has passed from the source to the destination instance.

The method to achieve elasticity and load balancing is described below. First of all, each instance monitors its CPU and memory utilization locally. For each subquery, one of the nodes from the set of nodes in which the subquery has been deployed, it is responsible for compiling the load information of all the nodes in which the subquery is deployed. A special process, called subquery provisioner, is responsible for this task in that node. All nodes of a subquery send periodically the load monitoring data to the provisioner. As part of load monitoring message, a node also sends the greatest timestamp among the tuples it has processed. The provisioner compares the relative load of the different nodes. If the imbalance between nodes exceeds a first given imbalance threshold, the provider decides how to rebalance partitions to balance the load. Once the decision is taken, it obtains the greatest known timestamp and sends a reconfiguration command to the load balancers from the source subquery and to subquery instances that will be reconfigured. State transfer is performed according to the aforementioned method.

The provisioner also checks if the node average load exceeds a second upper utilization threshold. If this happens, it means that the set of nodes running the subquery is close to saturation and a new node must be added in order to add computing capacity. Then, the subquery is deployed in one node from the set of available nodes. Once the new node is ready to run the subquery, the provisioner includes the new node in the set of nodes running the subquery. The load balancing mechanism detects an imbalance between the new node and the rest of the nodes and immediately starts the reconfiguration applying the load balancing method described above.

The provisioner also checks if the average load as a whole could be processed by a smaller number of nodes without exceeding the second maximum threshold average load. If this happens, the provisioner selects any node and reconfigures the system so that all partitions of that node are distributed evenly among the rest of nodes that process the subquery. The provisioner starts the reconfiguration as in the previous case and it is processed as a load balancing reconfiguration. When the reconfiguration finishes that node is returned to set of available nodes.

BRIEF DESCRIPTION OF THE DRAWINGS

In what follows a realization of the invention is described in an illustrative but not limitative way to ease the understanding of the invention. It refers to a series of figures.

DETAILED DESCRIPTION OF A EMBODIMENT

Figure 1:
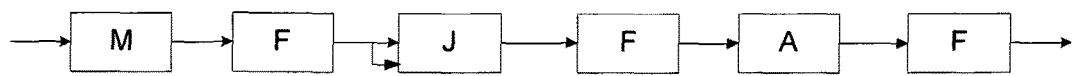
FIG. 1 shows a query with map (M), filter (F), join (J) and aggregate (A) operators.

FIG. 1 shows a query with Map (M), Filter (F), Join (J) and Aggregate (A) operators. In this query incoming tuples enter through the left operator. The map operator transforms a tuple with the associated transformation function. The filtering operator applies a predicate to the tuple, if it is satisfied, then the tuple is forwarded to the next operator, otherwise; it is discarded. The output of the filter operator is connected with the two inputs of the join operator. That is, each tuple produced by the filter operator is sent to each of the two inputs of the join operator performing a self-join. The join operator applies a predicate to all pairs kept in the two sliding windows (associated to the respective input streams). Each pair that satisfies the predicate is concatenated and generated as an output tuple. The next operator is an aggregate. It aggregates the tuples according to a given function or a group-by clause. A tuple is generated periodically with the aggregated value after each window slide. Finally, the last operator filters these tuples using a predicate.

Figure 2:
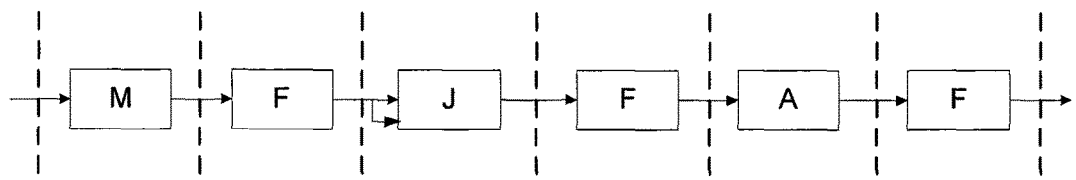
FIG. 2 shows a set of subqueries from the split of the query in FIG. 1 given one criterion of division.
Figure 3:
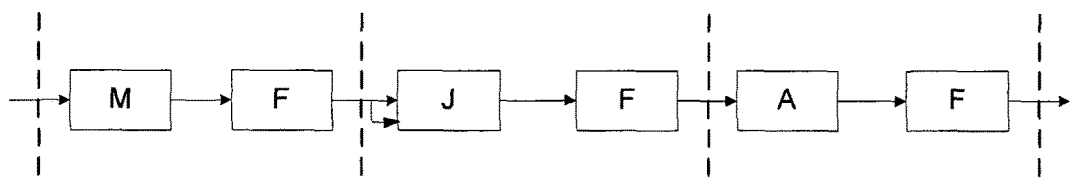
FIG. 3 shows a set of subqueries from the division of the query in FIG. 1 given another criterion of division.

FIGS. 2 and 3 show the same query shown in FIG. 1 partitioned into subqueries according to two different criteria. The partitioning is shown with dashed vertical lines. Subqueries correspond to each fragment of the original subquery delimited by the lines. FIG. 2 shows a partitioning in which each subquery consist of a one operator. The partitioning in FIG. 3 is done based on stateful operators. This has led to three subqueries. The first one is made up of a prefix of stateless operators, the map and filter, operators. The second one is made up of the join and filter operators. The third one is made up of the aggregate and filter operators. The subqueries are characterized by starting with a stateful operator followed by all stateless operators until the next stateful operator. The only exception is the prefix of stateless operators until the first stateful operator as it happens with the first subquery in FIG. 3.

Figure 4:
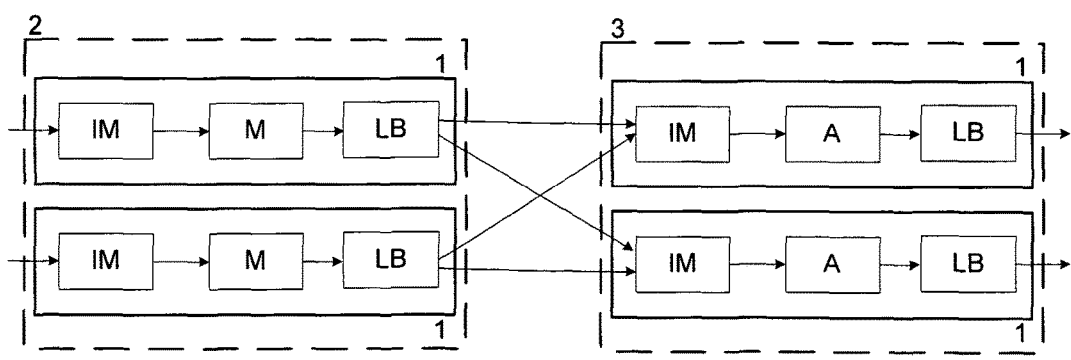
FIG. 4 shows two consecutive subqueries with source redistribution.

FIG. 4 shows two consecutive subqueries from a parallel-distributed query. Given two consecutive subqueries it is said that the first one is the source subquery (2) of the second one and the second one is the destination subquery (3) of the first one. The source subquery (2) in this case consists of a single operator, the map operator (M). The destination subquery (3) consists of a single operator, the aggregate operator (A). Each subquery is deployed into a set of nodes. In this case, each set has two nodes (1). An instance of the subquery is deployed in each one of the nodes (1) from each set of nodes. Each instance is executed in a different node (1). Each instance of a subquery is extended to become parallel-distributed with two distribution operators. An input merger (IM) is introduced at the beginning of each instance of each subquery. A load balancer (LB) is introduced at the end of each instance of each subquery. The load balancer (LB) is in charge of distributing the output tuples from each instance of a subquery to the instances of the destination subquery 3. The load balancer (LB) is semantic awareness, so it distributes the tuples that must be aggregated together to the same instance of the destination subquery (3).

Figure 5:
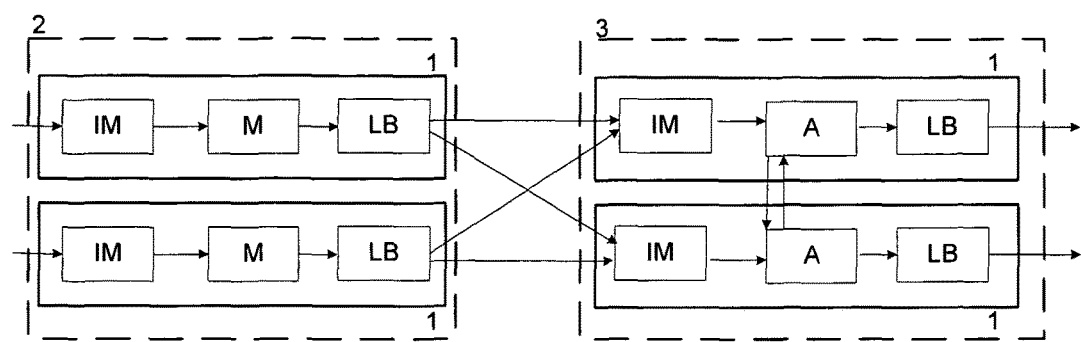
FIG. 5 shows two consecutive subqueries with redistribution at the source.

FIG. 5 shows the source (2) and destination (3) subqueries also shown in FIG. 4 but with destination redistribution. Tuples are sent by the load balancers (LB) of the source subquery (2) to any instance of the destination subquery (3) without semantic awareness. The stateful operator of destination subquery (3), in this case an aggregate operator (A), redistributes the tuples to the right instance with semantic awareness.

The preferential embodiment of the invention considers the case where transparent parallelization is provided. The case without transparency is a simplification of that one.

In this embodiment the most popular data streaming query operators are considered. The stateless query operators are map, filter and union. The stateful query operators are aggregate and join. In the embodiment the tuples include source timestamps. Timestamps are monotonically increasing.

The semantics assumed for stateless operators is the following. The map operator applies a function to each input tuple and generates an output tuple according to that function. The filter operator may have associated a sequence of one or more predicates and as many outputs as predicates, or one output more than predicates. That is, given n predicates it will have n or n+1 outputs. Predicates are evaluated one by one for each input tuple till one predicate is satisfied or none of them is satisfied. If the first predicate is satisfied, the input tuple is sent to the first output. If the first predicate is not satisfied, but it is satisfied the second one the tuple is sent to the second output, and so on. If there are n+1 outputs and n predicates, and a tuple does not satisfy any the predicates, tuple is sent to the output n+1. If there are n outputs and n predicates, and the tuple does not satisfy any predicate, the tuple is discarded, producing no output tuple.

The semantics assumed for stateful operators is as follows. Operators have a sliding window for each input stream. The window length can be expressed in time or number of tuples, for example, tuples received in the last hour or the last 1000 received tuples. When a new tuple arrives, it is inserted in the window applying the semantics of the operator. As result the oldest tuples exceeding the window length are discarded. For example, if the window length is 60 minutes and the difference between timestamps between tuple just inserted and the first tuple in the window are 61 minutes, the first tuple is eliminated from the window. The same happens to the second tuple in the window and so on.

The aggregate operator has one input and one output. The aggregate operator has one associated aggregate function fa, the set of fields ca used to group data (group-by clause) and the window advance or slide av. The aggregate function is applied to the tuples of the sliding window. The result is the aggregated value of all tuples in the window, for example, the average temperature on tuples showing temperature evolution over time. The set of fields indicated in the group-by clause determines which tuples are aggregated together. For instance, the number of calls by caller's phone number can be aggregated based on call description record tuples for phone calls. That is, each output tuple would show the number of calls made by each phone number that have made a call during the period considered by the current sliding window. If the group-by clause is present (i.e., grouping by a given field or a set of fields), each different value of that (those) field (s) is in a separated sliding window. For instance, if the caller's phone number is in the group-by clause, each phone number will have an associated sliding window that will contain those tuples corresponding to a given caller phone. The advance indicates how much the sliding window slides. If it is a time window, the advance indicates how long the window moves and if it is window length, the advance indicates how many tuples are slid. For example, in a time window of 60 minutes with an advance of 15 minutes, when a tuple is inserted such that the difference between its timestamp and the oldest tuple in the window exceeds 60 minutes, an output tuple is generated with the aggregated value during last 60 minutes. All tuples with difference greater than 60−15=45 minutes compared with the tuple just inserted are removed from the window. That is, the aggregate operator will produce output tuples with the same periodicity as the advance indicates. If the window length is expressed in number of tuples, an example of advance could be the following. With a window length of 100 tuples and an advance of 25 tuples, when tuple 101st arrives, a tuple is generated with the aggregate of the first 100 tuples of the window; then, the new tuple is inserted in the window and the first 25 tuples (the oldest 25 tuples) are eliminated.

The join operator has two inputs, each one with its own sliding window and an associated join predicate that receives a tuple from each input. If the predicate is satisfied by a pair of tuples, an output tuple is generated with the concatenation of these two tuples. Each time a new input tuple arrives, the tuple is matched against the tuples stored in the sliding window of the other input, for each pair satisfying the predicate with the incoming tuple, an output tuple is generated. When a new tuple is inserted in a sliding window, the tuples from the other sliding window beyond the window length are eliminated. For transparent parallelization the join operator is considered to be a deterministic operator. This join operator waits till there is a tuple in each input before inserting a tuple into the sliding windows. When there is a tuple in each input, it takes the one with smallest timestamp and proceeds as above. This way the join operator is independent of the tuple interleaving in its two inputs and thus, it behaves deterministically regardless of the actual interleavings.

The assumed method to propagate timestamps every time an output tuple is generated is as follows. For stateless operators, the output tuple has the same timestamp as the input tuple it comes from. For stateful operators with a single input stream, such as the aggregate operator, the timestamp of an output tuple is the smallest timestamp in the time window in which the output tuple was computed. For the join operator, the timestamp of each output tuple corresponds to the lowest timestamp between the pair of joined input tuples.

The parallel-distributed engine consists of a set of instances of a distributed query operator, a parallel query compiler and a set of parallelization and elasticity operators. There are two kinds of parallelization operators, load balancer and input merger. Elasticity operators are provisioners and available nodes manager.

The input of the query parallel compiler is a continuous query that is, an acyclic graph of query operators. The compiler splits the source query into subqueries, each subquery consisting of a subset of operators from the source query that are interconnected. The parallel compiler allows different parallelization strategies. One strategy consists in that each individual operator becomes a subquery. Another possible strategy consists in having a single subquery containing the complete source query. An intermediate strategy consists of subdividing the source query in many subqueries as stateful operators, plus an optional prefix of stateless operators that are at the beginning of the source query. Each subquery has one stateful operator, followed by all the stateless operators until the next subquery or subqueries. If the original query begins with a stateless operator, there is an additional subquery with all the stateless operators till the first query stateful operator(s). This parallelization strategy (stateful-subquery-partitioning) minimizes the network cost. It sends tuples over the network only when needed (to preserve transparency), that is, just before each stateful operator. Without loss of generality this parallelization strategy will be assumed in the rest of the description.

The source query is compiled by the parallel compiler, the result is a set of subqueries. The stateful-subquery-partitioning strategy described above is assumed. Each subquery is complemented as follows. An input merger is introduced at the beginning of the subquery. A load balancer is introduced at the end of each subquery output. Each subquery is deployed in a different set of nodes. An instance of the stream processing engine runs in each node. The deployment of a subquery in a set of nodes lies in the deployment of that subquery in the instance of the stream processing engine at each node. The subqueries are connected as follows. Each connection between an output of the source subquery with an input from a destination subquery in the original query results in a connection between the load balancer from that output at each instance of the source subquery and the input merger of each instance of the destination subquery. FIG. 5 shows an example of the connection of parallel subqueries, corresponding to the stateful-subquery-partitioning shown in FIG. 3, for the source query in FIG. 1.

Load balancers are semantic aware. That is, they distribute the load among the nodes of the next subquery (or subqueries) so that, the tuples that must be combined together in the same aggregate or join operator will be received and thus, processed by the same node. The semantic aware distribution can be implemented in anyway, but it must fulfill this requirement, that is, tuples that must be combined together are sent to the same instance of the destination subquery. The following semantic aware distribution will be adopted in the preferred present embodiment. A stateful operator of a destination subquery uses a field or a set of fields, C, to combine tuples that is called tuple key. For the join operator the key consists of the fields used in join predicate. For the aggregate operator the key consists of fields in the group-by clause. This way each output tuple has a key c. A hash function is applied to this key c obtaining the value $h=hash(c)$. The modulo operation is applied to the value h with a constant np, obtaining a value $p=h \mod np$, named partition identifier. The result of applying the above method to a tuple is the partition id. The total number of partitions is np, and the responsibility for processing a partition with identifier p corresponds to a single instance of the subqueries. Each instance is responsible for a subset of partitions. A single instance is responsible of processing the tuples of a given partition.

If input mergers are not transparent, they simply forward the tuples received from the instances of the source subquery as soon as they are received to their local instance of the subquery.

Load balancers and input mergers are extended to guarantee transparent parallelization. Input mergers wait to receive a tuple from each instance of the source subquery, and when this happens they forward the tuple with smallest timestamp to the their local instance of their subquery. Input mergers may block with this stream merging, if tuples are not received from one of the load balancers. Load balancers are extended to produce dummy tuples when they have not produced a tuple for a given period of time to avoid blocking. Each load balancer keeps track of the timestamp of the last generated tuple for each instance of the destination subquery (subqueries). When no tuple is sent during a maximum period of time m to a destination subquery, then a dummy tuple is sent with the timestamp of the last tuple sent by that load balancer (to any instances of the destination subquery). Periodic generation of dummy tuples avoids the blocking of the input merger when a load balancer does not generate tuples for an instance of the destination subquery and so that the input merger can progress.

The parallelization of stateless subqueries, that is, subqueries consisting exclusively of stateless operators simply requires round-robbing distribution of the different partitions among the instances of the subquery. That is, tuples are sent to each one of the instances of the destination subquery until a tuple has been sent to all of them, then it starts again with the first one. For instance, in a destination subquery with two instances, the first tuple would be sent to the first instance, the second tuple to the second instance, the third tuple to the first instance, and so on.

The parallelization of subqueries with stateful operators is more complex because it must be semantic aware of the stateful operators of the destination subquery. In this case the key space of the output tuples must be partitioned, so that each key is assigned a partition identifier, using for example, the hashing method aforementioned. Thus, given an output tuple with key c it is assigned a partition identifier p. On the other hand, every partition is assigned one instance and only one of the subquery that will be responsible for processing all tuples with that partition identifier. That method is used for the aggregate operator. Tuples with the same key are received by the same instance and that way they can aggregated together locally. This distribution method is also valid for the join with an equality predicate (equi-join). In this case the tuples with the same key, which are the only ones the predicate should be checked for, are received by the same instance of the destination subquery and thus, it can join the tuples with the same key. For instance, to join phone call tuples with the same calling phone number the join predicate requires that the field of the calling phone from the two tuples to be compared has the same value. Since tuples with the same calling phone number are received by the same instance of the destination subquery, they can be joined them locally. However, for the general case of the join operator (as it happens with the Cartesian product operator), when there is no equality predicate that must be satisfied by the tuples to be joined, a different the distribution method is used. To simplify the presentation it is assumed that the number of instances of the subquery with the join operator is a square number 1, 4, 9, 16, . . . . The number of instances is $i=j^2$. The instances are numbered from 0 to i−1. The join operator has two inputs that will be named left and right. Load balancers connected to the left input will send an output tuple to i instances of the destination subquery with the join operator. p is the tuple identifier under consideration. More specifically, the output tuple is sent to i instances numbered $d=p*j+o$, where o takes values from 0 to j−1. Load balancers connected to the right input will also send the output tuple to i instances of the destination subquery numbered with $d=p+o*j$ where o takes values from 0 to j−1. This ensures that all possible pairs among tuples with a temporal distance less than or equal to the length of the time window associated with the join operator will be generated.

Now, it is described how to extend the parallelization method to obtain elasticity, load balancing and fault tolerance. As mentioned above, the three properties require reconfiguring the system and the reconfiguration needs a state transfer procedure. To transfer the processing responsibility of a subquery responsible for a partition with identifier p from an instance A to another instance B of the same subquery, the state of the stateful operator of the subquery related to that partition must be transferred from A to B.

The state transfer procedure has the following steps. When the decision to reconfigure the system is made, reconfiguration implies the reassignment of data partitions from some instances to others. This collective reassignment can be decomposed into individual partition reassignments of a partition with identifier p from an instance A to an instance B. First of all, a timestamp mt is chosen, at which it the state transfer will start. This timestamp mtf, is greater than the greatest timestamp mt that is active in the set of nodes of the subquery for which the reconfiguration is done, such that $mtf=mt+f$, where f provides enough margin to notify all instances involved in the reconfiguration that must start the state transfer with those tuples with timestamp equal or greater than mtf. Timestamp mtf is communicated to all the instances of the source subquery (subqueries) that sends tuples to the reconfigured subquery (it will be called destination), as well as the two instances of the reconfigured destination subquery, A and B. Load balancers of the instances of the source subquery store timestamp mtf. The only tuples distributed in a different way are those that belong to partition p, the rest does not change its processing. Each load balancer redistributes the tuples it receives in increasing timestamp order. Each load balancer forwards the tuples it receives from partition p with timestamp lower or equal to mtf to instance A of the destination subquery, the initial responsible for partition p. When a load balancer receives the first tuple with timestamp greater than mtf, it sends that tuple to the instance B, the new responsible for partition p, an end-of-reconfiguration tuple with the partition identifier is sent just before that tuple. In the case of a join operator case with predicate without equality, there is a set of instances A with the original responsibility of the partition p and a set of instances B with destination responsibility. The process is applied similarly to all the sets of instances.

Besides the reconfiguration of load balancers, the state corresponding to partition p is transferred from the source instance A to the destination instance B. For the aggregate operator, this state consists of the aggregated value for partition p and the time window from the partition p. For the join operator case with equality operator in the predicate, it consists of the tuples from the two sliding windows associated to partition p. For the join operator case without equality in the predicate, it consists of the tuples associated to the transferred partition. The instance B waits until the state transfer completes and to receive the end-of-reconfiguration tuples from all load balancers. At that point, the instance B begins to process the tuples from partition p.

The procedure used to extend the parallelization process to achieve elasticity and load balancing is described below. For each subset of nodes processing a subquery, one node becomes the provisioner. Each node of the subset of nodes monitors periodically the local load at each node (by means of a direct metric such as percentage of CPU utilization or an indirect metric such as the number of queued tuples pending to be processed at the subquery instance). The monitoring information is sent periodically from each node of the subset of nodes to the provisioner. This monitoring message also includes the greatest timestamp processed by the instance. Thus, the provisioner knows the relative load of all nodes that execute an instance of the subquery. The provisioner compares the relative load across nodes. If the imbalance between the most loaded node and the less loaded one exceeds an upper imbalance threshold, the subquery is reconfigured by moving one or more data partitions from the most loaded node to the less loaded one. The reconfiguration procedure for each partition follows the one described above for state transfer.

The provisioner also calculates the average load of the nodes and if this average load exceeds another utilization threshold, it means that the set of nodes is close to saturation and a free node is provisioned. First of all, an instance from the query processing engine is deployed on that node with a copy of the subquery. Then, the load balancer from the new instance is connected to the input mergers to which the subquery output(s) is connected. The same is done with the input(s) of the input merger(s) and the outputs of the load balancers of the subquery to which their inputs are connected. From that point that instance of the subquery begins to report about its load which initially is null. This triggers the load balancing process described above.

The provisioner also checks if the current global load of the subquery could be satisfied with one node less without exceeding the upper utilization threshold of the average load. In that case, all the partitions of the less load node are redistributed evenly among the rest of the nodes. Each partition is reconfigured with the same procedure described for the load balancing. When all the data partitions have been reconfigured, the outputs of the load balancers connected to the inputs of the node to be decommissioned are disconnected and the outputs of the load balancers are also disconnected from the inputs of the following subquery (subqueries). Once the instance of the subquery of the node to be decommissioned is disconnected, that node is decommissioned and returned to the set of free nodes.

The proposed parallel-distributed engine and its procedure of parallel query processing can be deployed in a cloud computing system. More specifically, it can be deployed in an infrastructure as a service responsible for the management of free nodes. The elasticity procedure in that case is modified as follows. The provisioner of each subquery delegates the task of node management, getting and freeing nodes, to the infrastructure as service. Thus, when a new node is provisioned, the provisioner asks for a new node to the infrastructure as a service. When a node is freed, the infrastructure as a service is notified that the node is free.

The invention is applicable to the industrial sector of information systems of data stream processing and event processing. In both types of systems data streams are processed by continuous queries. Current solutions are either centralized or distributed, but in both cases the processing capacity of these systems is limited by the processing capacity of a single node because the whole input data stream is processed by a single node to process a given query operator, a subquery or a full query. This limitation prevents current systems from scaling out with respect to the volume of the input data stream.

Once the invention has been clearly described, it is stated that the specific embodiments described above are amenable f minor modifications without altering the fundamental principle and the essence of the invention.

The invention claimed is:

1. A parallel data stream processing engine executing continuous queries on a plurality of processing nodes, wherein a continuous query comprises a plurality of interconnected operators, each operator of the query being selectable between stateless operator and stateful operator, and wherein the processing engine is configured to:
   a) split a continuous query into at least two sub-queries, wherein each sub-query includes one stateful operator followed by at least a stateless operator, except a first sub-query which only contains stateless operators;
   b) associate each sub-query to at least two processing nodes, wherein the each of the processing nodes is configured to execute an instance of the each sub-query; and wherein an executed sub-query generates at least one tuple;
   c) label the tuples with an ordering label comprising a timestamp indicating a relative ordering among the tuples and used for ordering the tuples to a destination sub-query at an input merger located in the destination sub-query;
   d) send and receive tuples across interconnected sub-queries, a source sub-query and a destination sub-query comprising interconnected operators between said sub-queries; wherein the processing engine comprises:
      for each processing node executing a source sub-query, a load balancer at an output of each instance of the source sub-query and every instance the source sub-query output is connected to an input of the load balancer and an output of the load balancer is connected to all instances of the destination sub-query;
      for each processing node executing an instance of the destination sub-query, an input merger configured to receive a plurality of generated tuples sent by each load balancer of every instance of the source sub-query;
      each input merger waits to receive a tuple from the load balancer of the each instance of each source sub-query before forwarding the tuple with a smallest timestamp to the destination sub-query, and each load balancer stores the timestamp from a last generated tuple for each destination sub-query and if no tuple has been sent to the destination sub-query after a maximum prefixed period of time, then the load balancer is configured to send a dummy tuple with the same timestamp as the last tuple sent by the load balancer;
   wherein the load balancer is configured to determine the processing node to which a tuple is sent based at least in part on a key field contained in the tuple; and
   wherein in each sub-query an input merger at the beginning of each operator and a load balancer at the end of each operator are introduced, where the sub-query is executed; and
   wherein each load balancer of the source sub-query is connected to each input merger respectively to distribute the output tuples from the source sub-query to the destination sub-query, wherein each load balancer is configured to:
      either send tuples with a same key field to a same processing node executing the destination sub-query when the destination sub-query comprises one stateful operator, or
      send tuples to the destination sub-query in a round robin fashion when the destination sub-query comprises only stateless operators.

2. The processing engine according to claim 1, wherein when splitting a continuous query, the processing engine is configured to use a method for splitting a source query into as many sub-queries as operators included in the original query.

3. The processing engine according to claim 2, being further configured to reconfigure the processing of tuples corresponding to a partition p, by transferring the processing of said tuples from a source processing node to a destination processing node, and said reconfiguring comprises:
   (1) obtaining a greatest active timestamp in the system, mt;
   (2) establishing a future timestamp mtf, by adding a temporal shift includes a time margin f to the greatest active timestamp in the system, mt, mtf=mt+f;
   (3) sending, during the time margin f, a reconfiguration command including a timestamp mtf that begins the reconfiguration, to all source sub-queries involved in the reconfiguration;
   (4) storing the timestamp mtf in all load balancers of the source sub-query;
   (5) sending tuples corresponding to the reconfigured partition p with timestamp less than or equal to mtf by the load balancers of the source sub-query to the processing node executing the destination sub-query responsible for the partition p before the reconfiguration started;
   (6) sending one tuple by the load balancers of the source sub-query that indicates an end of reconfiguration to the processing nodes executing the destination sub-query involved in a state transfer before sending a first tuple from partition p greater than mtf;
   (7) sending tuples belonging to reconfigured partition p with timestamp greater than mtf by the load balancers of the source sub-query to the processing node executing the destination sub-query responsible for the partition p after the reconfiguration;
   (8) transferring a state of partition p to the destination processing node after receiving the tuple that indicates the end of reconfiguration from all load balancers of the source sub-query; and
   (9) applying at the destination processing node the state of the partition p after receiving the state transfer from partition p.

4. The processing engine according to claim 3, wherein a processing node of the at least one processing node where a sub-query is executed is configured to:
   (I) receive periodically from all the processing nodes where the sub-query is being executed, data about CPU and memory utilization at each processing node, and a greatest timestamp among the processed tuples at each processing node;
   (II) compare utilization data across the processing nodes executing the sub-query;
   (III) send a reconfiguration command to the involved processing nodes of the source and destination sub-query if, for a sub-query, comparison between utilization data exceeds a first given upper utilization threshold, the processing node reconfigures at least a data partition;

(IV) adds the selected processing node to the set of processing nodes that executes the sub-query so that the selected processing node will receive load from other processing nodes automatically if an average load of the processing nodes of a sub-query exceeds a given second upper imbalance threshold, the processing node selects one processing node from a set of free processing nodes; and (V) sends a reconfiguration command to the selected processing node so all selected processing node partitions will be distributed among remaining processing nodes that execute the sub-query if the average load of the processing nodes of a sub-query can be satisfied with a smaller set of processing nodes without exceeding the second upper utilization threshold, the processing node selects one processing node from the set of processing nodes where the sub-query is being executed.

5. The processing engine according to claim 1, wherein when sending tuples received with the same key to the processing node executing a destination sub-query, the processing engine is configured to:

(i) apply to the key of each tuple a hash function obtaining a hash value h;

(ii) obtain a partition identifier p of the tuple, making a modulo operation by a constant np, obtaining a value p=h mod np; and (iii) assign each partition with identifier p to a processing node executing a destination sub-query.

6. The processing engine according to claim 1, wherein:

each input merger forwards tuples as an input merger receives the tuples from any of the source sub-queries to the destination sub-query.

7. A parallel data stream processing method executing continuous queries on a plurality of processing nodes, wherein a continuous query comprises a plurality of interconnected operators, each operator of the query being selectable between stateless operator and stateful operator, and the method comprises:

(a) split a continuous query into at least two sub-queries, wherein each sub-query includes one stateful operator followed by at least a stateless operator, except a first sub-query which only contains stateless operators;

(b) associating each sub-query to at least two processing nodes, wherein the each of the processing nodes is configured to execute an instance of the each sub-query; and wherein an executed sub-query generates at least one tuple;

(c) labeling the tuples with an ordering label comprising a timestamp indicating a relative ordering among the tuples and used for ordering the tuples to a destination sub-query at an input merger located in the destination sub-query;

(d) sending and receiving tuples across interconnected sub-queries, a source sub-query and a destination sub-query comprising interconnected operators between said sub-queries; wherein the sending and receiving of tuples comprise:

for each processing node executing a source sub-query, a load balancer at an output of each instance of the source sub-query and every instance the source sub-query output is connected to an input of the load balancer and an output of the load balancer is connected to all instances of the destination sub-query;

for each processing node executing an instance of the destination sub-query, receiving a plurality of generated tuples sent by each load balancer of every instance of the source sub-query by means of an input merger;

each input merger waits to receive a tuple from the load balancer of the each instance of each source sub-query before forwarding the tuple with a smallest timestamp to the destination sub-query, and each load balancer stores the timestamp from a last generated tuple for each destination sub-query and if no tuple has been sent to the destination sub-query after a maximum prefixed period of time, then the load balancer is configured to send a dummy tuple with the same timestamp as the last tuple sent by the load balancer;

wherein the load balancer is configured to determine the processing node to which a tuple is sent based at least in part on a key field contained in the tuple, the field called a key field destination sub-query input merger; and wherein in each sub-query an input merger at the beginning of each operator and a load balancer at the end of each operator are introduced, where the sub-query is executed; and wherein each load balancer of the source sub-query is connected to each input merger of the destination sub-query respectively to distribute the output tuples from the source sub-query to the destination sub-query, wherein each load balancer is configured to:

either send tuples with a same key field to a same processing node executing the destination sub-query when the destination sub-query comprises one stateful operator, or send tuples to the destination sub-query in a round robin fashion when the destination sub-query comprises only stateless operators.

8. The method according to claim 7, wherein the splitting of continuous queries comprises splitting a source query into as many sub-queries as operators included in the original query.

9. The method according to claim 8, wherein further comprising reconfiguring processing of tuples corresponding to a partition p, by transferring the processing of said tuples from a source processing node to a destination processing node, said reconfiguring comprising:

(1) obtaining a greatest active timestamp in the system, mt;

(2) establishing a future timestamp mtf, by adding temporal shift includes a time margin f to the greatest active timestamp in the system, mt, mtf=mt+f;

(3) sending, during the time margin f, a reconfiguration command including a timestamp mtf that begins the reconfiguration to all source sub-queries involved in the reconfiguration;

(4) storing the timestamp mtf in all load balancers of the source sub-query;

(5) sending tuples corresponding to the reconfigured partition p with timestamp less than or equal to mtf by the load balancers of the source sub-query to the processing node executing the destination sub-query responsible for the partition p before the reconfiguration started;

(6) sending one tuple by the load balancers of the source sub-query that indicates an end of reconfiguration to the processing nodes executing the destination sub-query involved in a state transfer before sending a first tuple from partition p greater than mtf;

(7) sending the tuples belonging to reconfigured partition p with timestamp greater than mtf by the load balancers of the source sub-query to the processing node executing the destination sub-query responsible for the partition p after the reconfiguration;

(8) transferring a state of partition p to the destination processing node after receiving the tuple that indicates the end of reconfiguration from all load balancers of the source sub-query; and (9) applying at the destination processing node the state of the partition p after receiving the state transfer from partition p.

10. The method according to claim 9, further comprising use of a processing node of the at least one processing node where a sub-query is executed to perform steps comprising:

(I) receiving periodically from all the processing nodes where the sub-query is being executed, data about CPU and memory utilization at each processing node, and a greatest timestamp among the processed tuples at each processing node;

(II) comparing utilization data across the processing nodes executing the sub-query;

(III) if, for a sub-query, comparison between utilization data exceeds a first given upper utilization threshold, the processing node reconfigures at least a data partition, and results in sending a reconfiguration command to the involved processing nodes of the source and destination sub-query;

(IV) if an average load of the processing nodes of a sub-query exceeds a given second upper imbalance threshold, the processing node selects one processing node from a set of free processing nodes, and adds the selected processing node to the set of processing nodes that executes the sub-query so that the selected processing node will receive load from other processing nodes automatically; and (V) if the average load of the processing nodes of a sub-query can be satisfied with a smaller set of processing nodes without exceeding the second upper utilization threshold, the processing node selects one processing node from the set of processing nodes where the sub-query is being executed, and sends a reconfiguration command to the selected processing node so all selected processing node partitions will be distributed among remaining processing nodes that execute the sub-query.

11. The method according to claim 7, wherein the sending of tuples received with the same key to the processing node executing a destination sub-query, the processing engine is configured to:

(i) apply to the key of each tuple a hash function obtaining a hash value h;

(ii) obtain a partition identifier p of the tuple, making a modulo operation by a constant np, obtaining a value p=h mod np; and (iii) assign each partition with identifier p to a processing node executing a destination sub-query.

12. The method according to claim 7, wherein;

each input merger forwards tuples as an input merger receives the tuples from any of the source sub-queries to the destination sub-query.

* * * * *